United States Patent
Timsit et al.

(10) Patent No.: US 12,163,320 B2
(45) Date of Patent: *Dec. 10, 2024

(54) TOUCHLESS FAUCET

(71) Applicant: Adams Rite Aerospace, Inc., Fullerton, CA (US)

(72) Inventors: Matthew Timsit, Tustin, CA (US); Nera-Lee Herzig-Patel, Newcastle, WA (US); Enoch Hwang, La Habra, CA (US); Juan Pena, Ontario, CA (US); Chris Selstad, Yorba Linda, CA (US); Dan Lau, Torrance, CA (US)

(73) Assignee: Adams Rite Aerospace, Inc., Fullerton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,097

(22) Filed: Oct. 3, 2023

(65) Prior Publication Data

US 2024/0026665 A1    Jan. 25, 2024

Related U.S. Application Data

(63) Continuation of application No. 17/324,289, filed on May 19, 2021, now Pat. No. 11,781,299.

(60) Provisional application No. 63/026,989, filed on May 19, 2020.

(51) Int. Cl.
*E03C 1/05*     (2006.01)
*F16K 11/00*    (2006.01)

(52) U.S. Cl.
CPC ............ *E03C 1/057* (2013.01); *F16K 19/006* (2013.01)

(58) Field of Classification Search
CPC ......... E03C 1/057; E03C 1/084; F16K 19/006
USPC ............ 4/623, 619, 302, 313, 668; 137/562; 251/131

See application file for complete search history.

(56) References Cited

U.S. PATENT DOCUMENTS

| | | |
|---|---|---|
| 10,301,799 B2 | 5/2019 | Thompson et al. |
| 2004/0221899 A1 | 11/2004 | Parsons et al. |
| 2007/0157976 A1 | 7/2007 | Paterson et al. |

FOREIGN PATENT DOCUMENTS

| | | |
|---|---|---|
| CA | 2843596 A | 2/2013 |
| EP | 3913152 A1 | 11/2021 |
| WO | 2013/019272 A2 | 2/2013 |

OTHER PUBLICATIONS

International Search Report and Written Opinion of corresponding PCT Application No. PCT/US2021/033069, dated Jul. 2021, 14 pages.

*Primary Examiner* — Lori L Baker
(74) *Attorney, Agent, or Firm* — Tucker Ellis LLP

(57) ABSTRACT

A touchless faucet includes a faucet body having a first compartment and a second compartment, where the second compartment has a mixing chamber for mixing fluid and a flow passage. The faucet also includes an aerator coupled to the faucet body and configured to receive fluid from the flow passage, a control board disposed in the first compartment, a solenoid disposed in the second compartment and communicatively coupled to the control board, and an IR sensor disposed in the first compartment for sensing a presence of a user.

20 Claims, 7 Drawing Sheets

TOUCHLESS FAUCET

RELATED APPLICATIONS

This application is a continuation of U.S. patent application Ser. No. 17/324,289, filed May 19, 2021, which claims the benefit of U.S. Provisional Application No. 63/026,989 filed May 19, 2020, which is hereby incorporated herein by reference.

FIELD OF INVENTION

The present invention relates generally to faucet, and more particularly to a touchless faucet for a lavatory.

BACKGROUND

Water is one of the necessary loads carried by an aircraft. In commercial aviation, it is desirable to use the minimum amount, yet have sufficient water available to satisfy the requirements of the passengers and crew. A mechanical device can be provided that automatically closes a valve in a conduit supplying water to the faucet after a predetermined period.

SUMMARY OF INVENTION

The present application provides a touchless faucet having a faucet body having a first or electrical compartment and a second or fluid compartment. The faucet includes at least one control board disposed in the first compartment, an IR sensor disposed in the first compartment and communicatively coupled to the at least one control board, and a solenoid disposed in the second compartment and communicatively coupled to the at least one control board.

According to an aspect, a touchless faucet is provided including a faucet body having a faucet body having a first compartment and a second compartment, at least one control board disposed in the first compartment, an IR sensor disposed in the first compartment and communicatively coupled to the at least one control board, and a solenoid disposed in the second compartment and communicatively coupled to the at least one control board, the solenoid having an inlet for receiving fluid from a mixing chamber formed in the second compartment and an outlet for delivering the fluid from the mixing chamber to an aerator, wherein the IR sensor is configured to sense a presence of a user, which is communicated to the at least one control board, and the at least one control board is configured to communicate the presence to the solenoid to open the solenoid to allow fluid flow through the second compartment to the aerator.

According to another aspect, a touchless faucet is provided including a faucet body having a first compartment and a second compartment, the second compartment having a mixing chamber for mixing fluid and a flow passage, an aerator coupled to the faucet body and configured to receive fluid from the flow passage, a control board disposed in the first compartment, a solenoid disposed in the second compartment and communicatively coupled to the control board, the solenoid having an inlet for receiving fluid from the mixing chamber and an outlet for delivering the fluid from the mixing chamber to the flow passage, and an IR sensor disposed in the first compartment for sensing a presence of a user.

According to still another aspect, a method for operating a faucet is provided that includes sensing a presence of a user via an IR sensor disposed in an electronics compartment in a faucet body of the faucet, communicating the presence of the user to a control board in the electronics compartment, opening a solenoid disposed in a fluid compartment in the faucet body via a command from the control board, delivering fluid from a mixing chamber in the fluid compartment into the open solenoid, delivering fluid from the solenoid to a flow passage in the fluid compartment, and delivering fluid from the flow passage to an aerator coupled to the faucet body.

The foregoing and other features of the application are described below with reference to the drawings.

DETAILED DESCRIPTION

Figure 1:
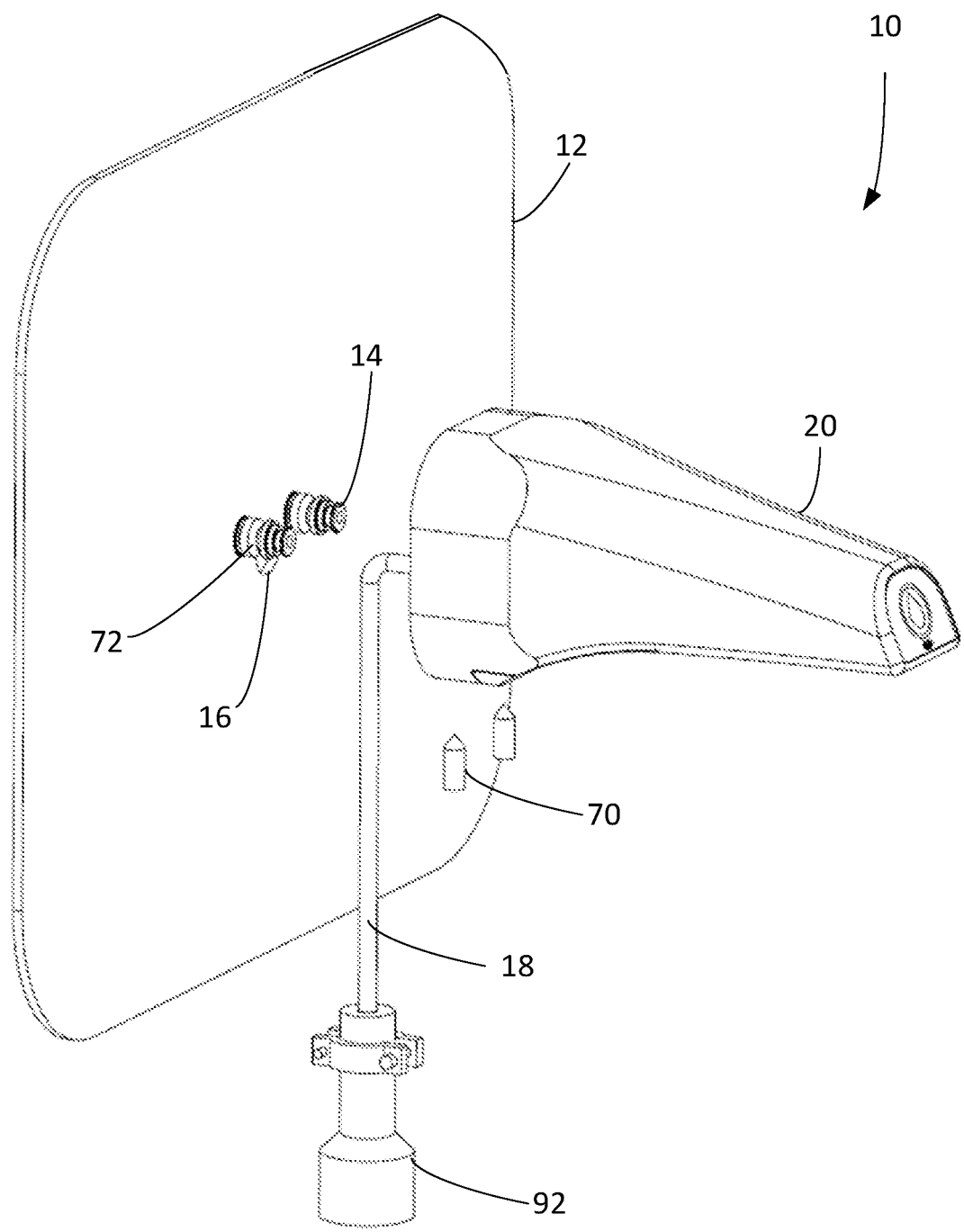
FIG. 1 is a perspective view an exemplary faucet and attachment structure.
Figure 2:
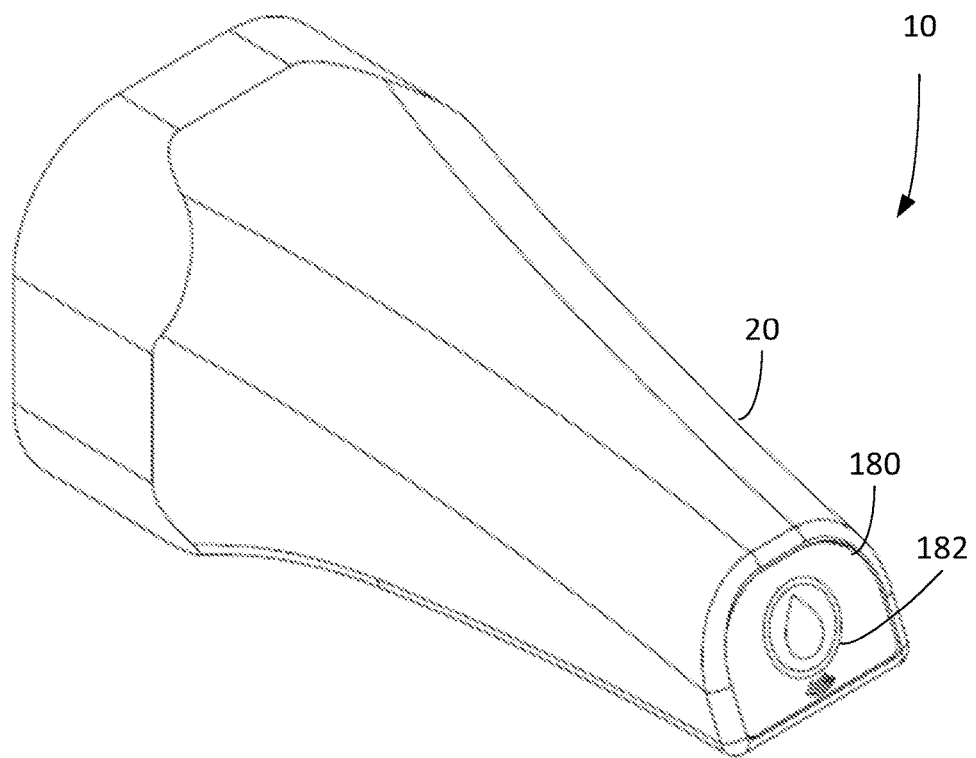
FIG. 2 is a perspective view of the faucet.
Figure 3:
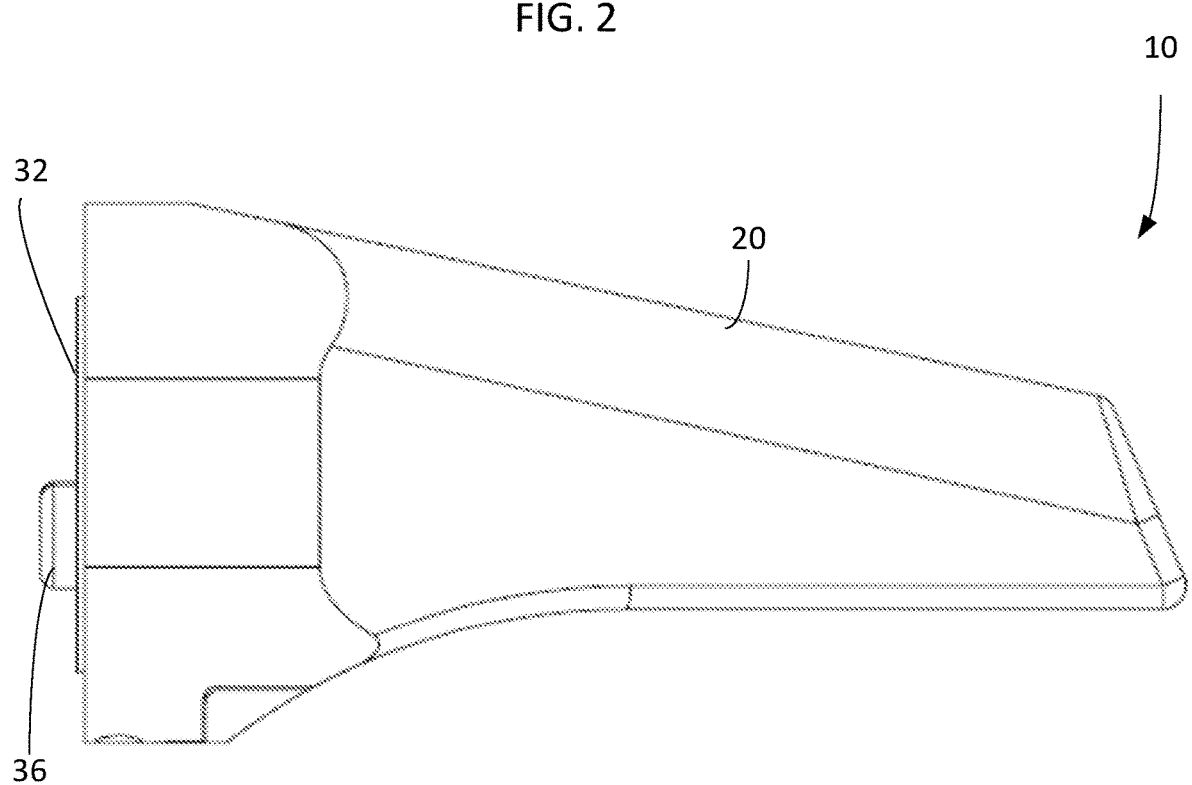
FIG. 3 is a side view of the faucet.
Figure 4:
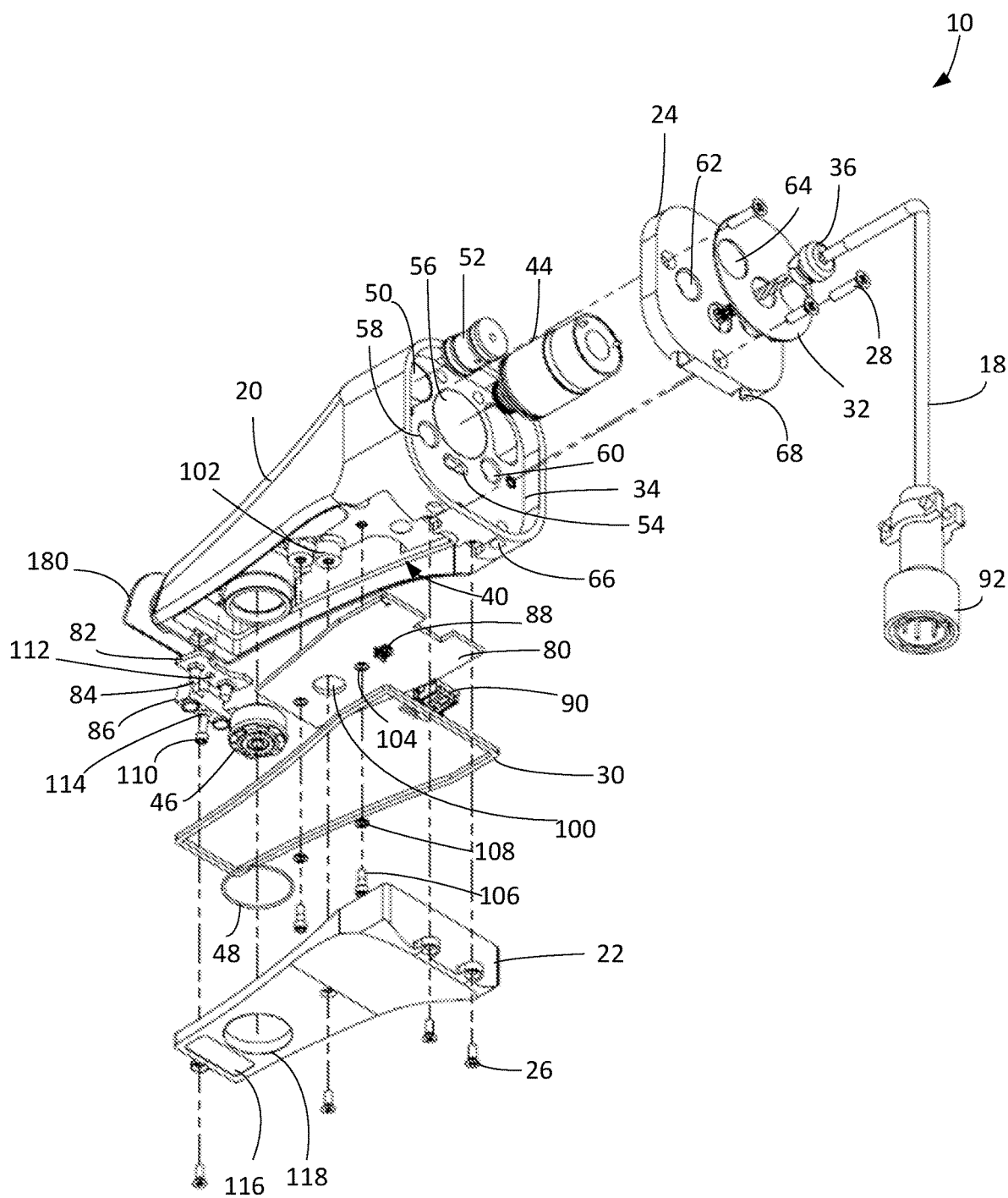
FIG. 4 is a rear perspective exploded view of the faucet.

The principles of the present application relate to a faucet, such as a touchless faucet for use in an aircraft lavatory, and thus will be described below in this context. It will be appreciated that the principles of the application may be applicable to faucets and water delivery devices in other suitable locations, such as public restrooms, building lobbies, etc.

Turning now to FIGS. 1-4, a faucet is shown generally at reference numeral 10. The faucet 10 is a touchless faucet configured to attach to a structure 12, such as a panel or wall of an aircraft lavatory. The structure 12 includes or is attached to a pair of connectors 14 attached to conduits to connect the faucet 10 to a fluid source, such as a hot and cold water source, and one or more openings 16 through which a cable 18 extends to attach the faucet to a power source. It will be appreciated that the faucet may alternatively be designed to be deck mounted.

The faucet 10 includes a faucet body 20, a bottom cover 22 attached to a bottom of the faucet body 20, and a rear cover 24 attached to a rear of the faucet body 20. The bottom cover 22 and rear cover 24 may be attached to the faucet body in a suitable manner, for example by fasteners 26 and 28 respectively received in respective openings. The bottom cover 22 may be sealed to the faucet body 20 in a suitable manner, for example by a gasket 30, and the rear cover 24 may be sealed to the structure 12 in a suitable manner, for example by gasket 32. The rear cover 24 is received in a recessed area 34 at the rear of the faucet body 20 allowing the rear cover 24 to be substantially flush with the rear of the faucet body 20. The recessed area 34 provides access to various ports discussed below, and the rear cover 24 serves to retain various components within the ports. A grommet 36 may be received in openings in the rear cover 24 and the gasket 32 that surrounds the cable 18. The faucet body 20, bottom cover 22, and rear cover 24 may be made out of a suitable material, such as suitable plastic that provides for corrosion resistance and weight savings for the faucet, such as a polyetherimide resin suitable for use with potable water, and the components may be made in a suitable manner, such as by injection molding.

The faucet body 20 may include a first compartment 40 or electrical compartment for receiving suitable controls, and a second compartment 42 (FIG. 6) or fluid compartment defining a flow area that receives a solenoid 44 that is activated to deliver water, for example at a uniform temperature to an aerator 46. The aerator 46 is attached to the underside of the faucet body 20 and sealed in a suitable manner, such as by an O-ring 48. The first and second compartments and 42 allow for the electronics, solenoid, and mixing chamber to be located inside the faucet body 20 rather than one or more components being positioned outside the faucet body.

The faucet body 20 also includes, at the rear of the faucet body, a port 50 for receiving a vent valve 52, a port 54 for receiving the power cable 18, a port 56 for receiving the solenoid 44 and forming part of the second compartment 42, and first and second water ports 58 and 60 for connecting to the hot and cold water lines via the connectors 14. The port 54 is in communication with the first compartment 40 allowing the power cable 18 to extend through the port 54 and into the first compartment 40 to provide power to the system. The first and second water ports 58 and 60 are aligned with corresponding openings 62 and 64 in the rear cover 24 and the gasket 32, and the connectors 14 extend into the recessed area 34 and the ports 58 and 60 via the openings 62 and 64. The faucet body 20 also includes a pair of openings 66 at the bottom rear of the faucet body 20 that align with corresponding openings 68 at the bottom of the rear cover 24 for receiving fasteners 70, such as set screws that are received in grooves 72 in the respective connectors 14 to attach the faucet 10 to the structure 12.

Figure 5:
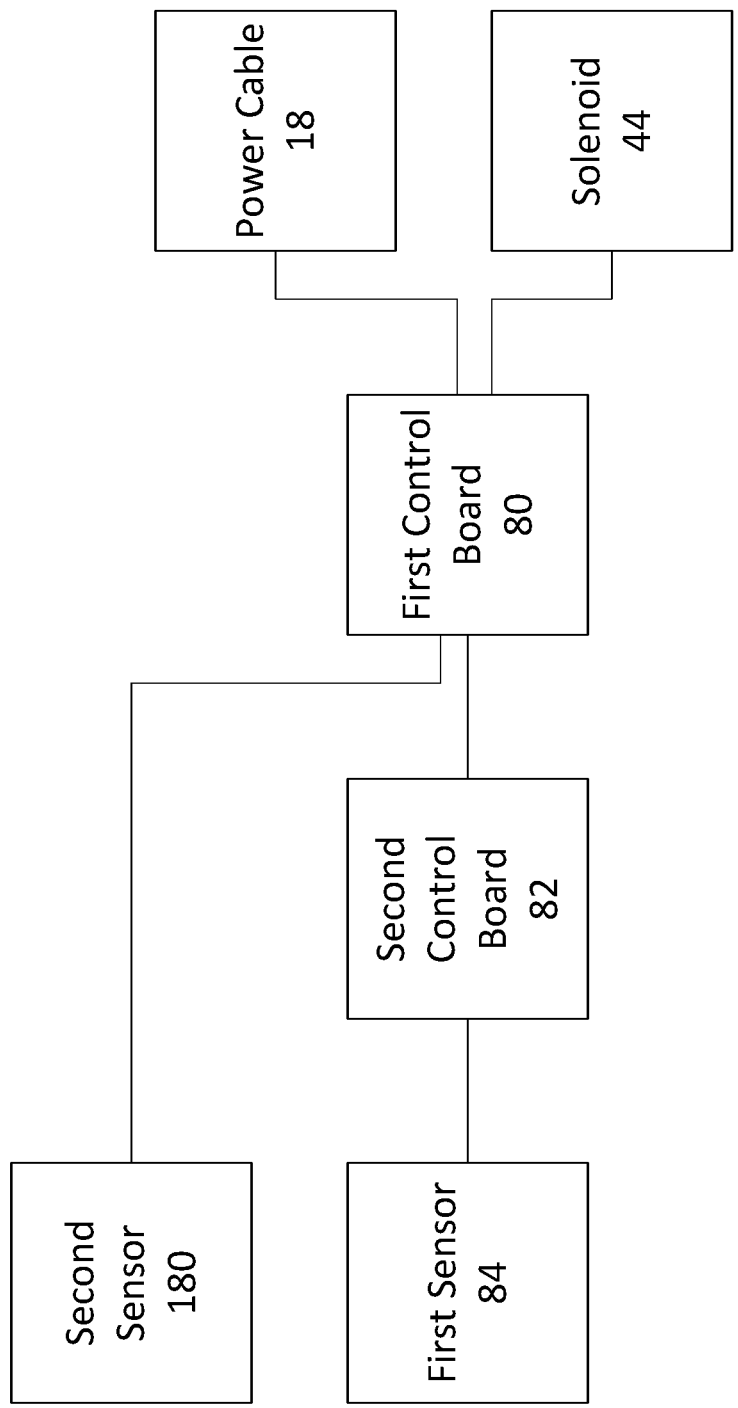
FIG. 5 is a schematic illustration of controls of the faucet.

Referring additionally to FIG. 5, the first compartment 40 will be described in detail. The first compartment 40 houses at least one control board. The at least one control board can include a single control board sized to fit within the first compartment or multiple control boards coupled together in any suitable manner, for example by wires, printed circuit board material, etc. For purposes of discussion, the first compartment will be described as including a control board such as a faucet printed circuit board assembly (PCBA) 80 and a control board such as an optical PCBA 82. The first compartment 40 also includes one or more sensors 84, such as an IR sensor attached to the optical PCBA 82, and an optical baffle 86 covering the IR sensor 84. The first compartment 40 is a recessed area at the bottom of the faucet body 20 that provides for all of the electrical components to be housed within the faucet 10. The faucet PCBA 80 is connected to the optical PCBA 82 by suitable wires, which may be connected to the PCBAs in any suitable manner. Also attached to the faucet PCBA 80 is a connector (not shown) that receives a corresponding connector 88, such as a picoblade receptacle, that is connected to wires that are connected to the solenoid 44 allowing the solenoid 44 to communicate with the faucet PCBA 80. The faucet PCBA 80 is also attached to a connector (not shown) that receives a corresponding connector 90, such as a microclasp housing, that is connected to the cable 18. The power cable 18 may have a connector 92 at its opposite end for connecting to a power source, which may be an electrical connection to the aircraft and/or one or more batteries to provide power to the faucet 10.

The faucet PCBA 80 is positioned in the first compartment 40 rearward of the aerator 46, and the optical PCBA 82 is positioned in the first compartment 40 forward of the aerator 46. The faucet PCBA 80 includes an opening 100 through which a projection 102 in the first compartment 40 extends, and openings 104 for receiving suitable fasteners. The projection 102 is configured to receive one of the fasteners 26 that secure the bottom cover 22 to the faucet body 20. The faucet PCBA 80 may be secured in the first compartment 40 in a suitable manner, such as by fasteners 106 surrounded by washer 108 that are received in the openings 104. Similarly, the optical PCBA 82 and the optical baffle 86 may be secured in the first compartment 40 in a suitable manner, such as by a fastener 110 received in corresponding openings 112 and 114 in the optical PCBA 82 and the optical baffle 86 respectively.

The first compartment 40 is closed by the bottom cover 22, which is secured by the fasteners 26. The bottom cover 22 includes an opening that receives an IR lens 116, and an opening 118 through which the aerator 46 extends. The IR lens 116 is provided to filter out visible light an only allow for infrared light.

Figure 6:
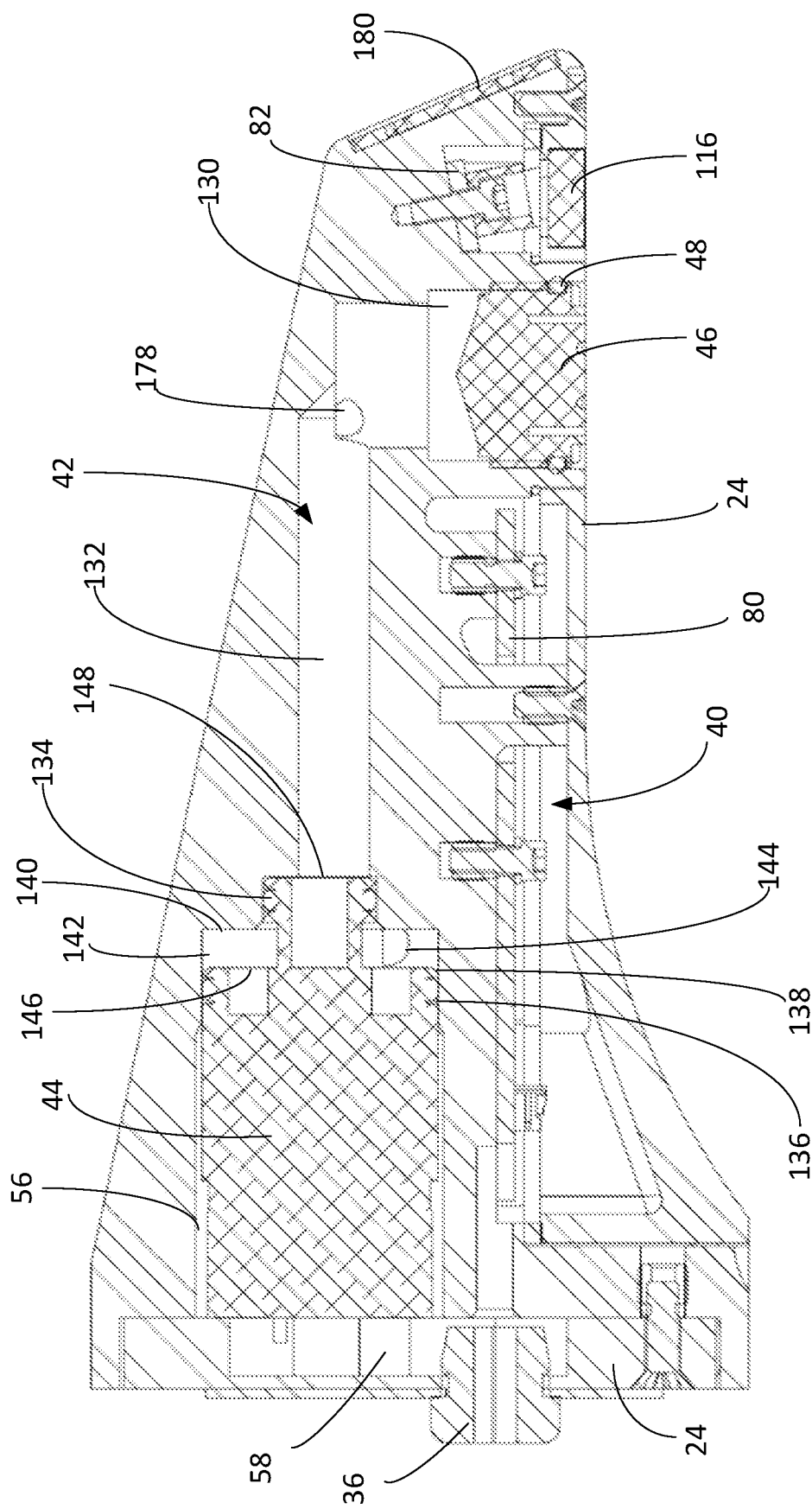
FIG. 6 is a cross-sectional view of the faucet taken about line 6-6 in FIG. 7.

Referring additionally to FIG. 6, the second compartment 42 and components therein will be described in detail. The second compartment 42 includes the port 56 that receives the solenoid 44, a port 130 that receives the aerator 46, and a flow passage 132 between the port 56 and the port 130. The second compartment 42 provides for all of the fluid components to be housed within the faucet 10. The solenoid 44 is received in the port 56 and sealed thereto by a suitable seals, such as O-rings 134 and 136 received in respective seal grooves, and the aerator is sealed to the port 130 by the seal 48. A front shoulder 138 of the solenoid 44 forms with a wall 140 of the port 56 a mixing chamber 142 between the seals 134 and 136 for receiving hot and cold water and mixing the water to a uniform temperature prior to the water flowing into the solenoid 44. The hot and cold water is delivered through water lines connected to the connectors 14, which travels through ports 58 and 60 and through passages 144, one of which is shown in FIG. 6, into the mixing chamber 142.

The solenoid 44 includes one or more inlets 146, and as shown two inlets 146 that receive the mixed water when opened, and the water flows through the solenoid 44 and exits the solenoid 44 at outlet 148 when the solenoid is opened. The outlet 148 is downstream of the mixing chamber. The water exiting the solenoid 44 via outlet 148 flows through the passage 132 to the port 130 where the water exits the faucet 10 via the aerator 46. As shown, the passage 132 extends substantially in a horizontal direction to receive the fluid from the outlet 148 and the port 130 is substantially in a vertical direction to receive the fluid from the passage 132.

Figure 7:
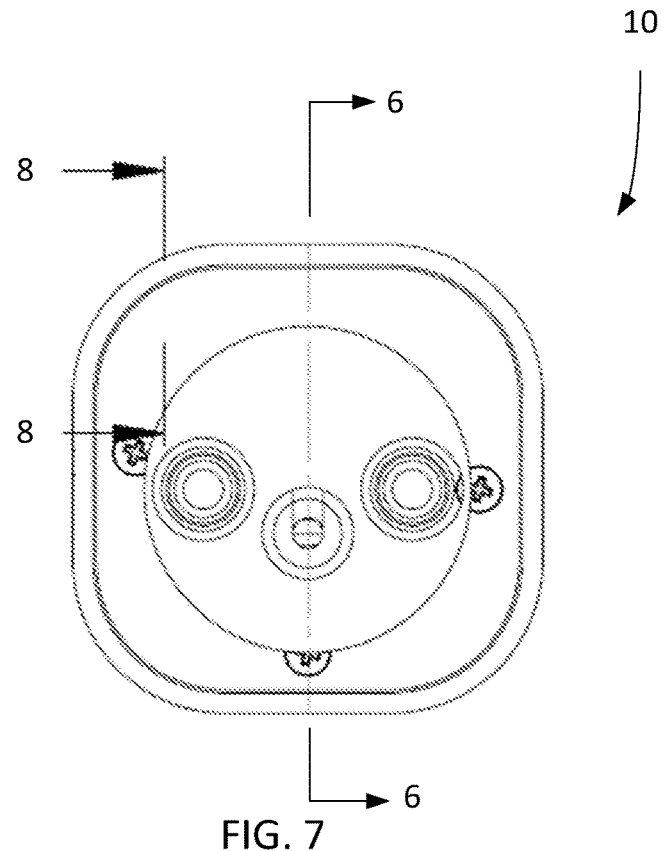
FIG. 7 is a rear view of the faucet.
Figure 8:
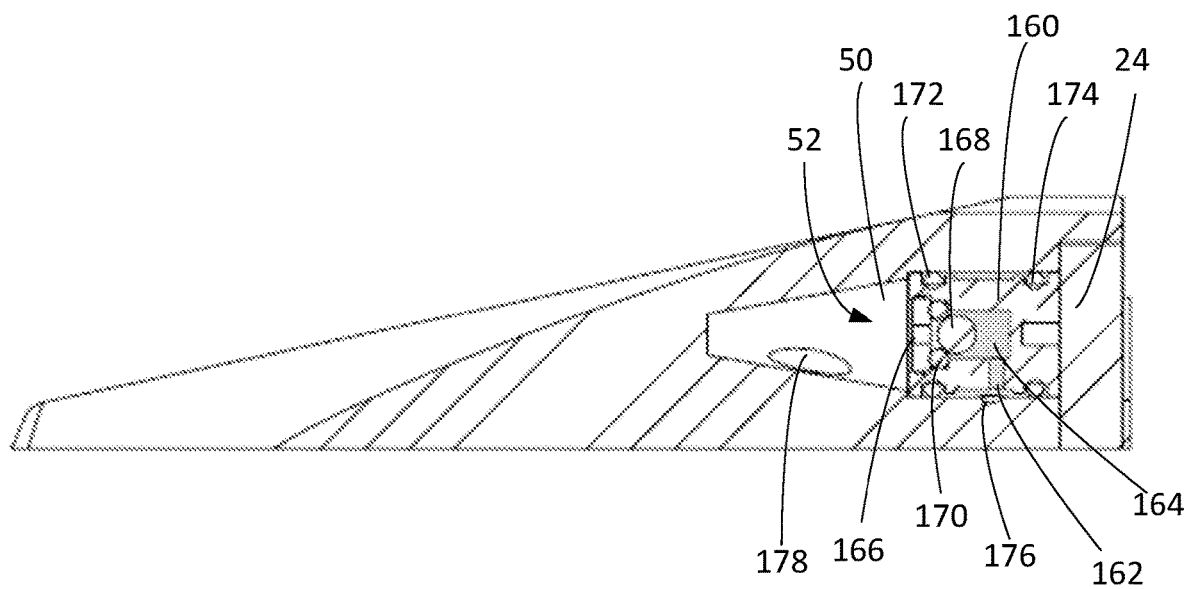
FIG. 8 is a cross-sectional view take about line 8-8 in FIG. 7.

Turning additionally to FIGS. 7 and 8, the vent valve 52 will be described in detail. The vent valve 52 allows for the faucet 10 to be self-venting. The vent valve 52 includes a valve body 160 having an inlet 162, an internal cavity 164 in communication with the inlet 162, an outlet 166 in communication with the internal cavity 164, and a ball 168 disposed in the internal cavity 164 and seated against a suitable seal 170, such as an O-ring, when the aircraft is pressurized to seal against the outlet 166. The vent valve 52 is received in the port 50 and sealed thereto by suitable seals, such as O-rings 172 and 174 received in respective seal grooves to allow for fluid flow between a wall of the port 50 and an outer surface of the body 160 of the vent valve 52 between the seals 172 and 174.

The vent valve 52 is in communication with the water supply and the second compartment 42. For example, the faucet body 20 includes a passage 176 between the water port 58 and the port 50 for the vent valve 52 to allow for communication between the water lines via their connection through the second compartment 42 and the inlet of the vent valve 52, and a passage 178 between the second compartment 42 and the port 50 to allow for communication between the aerator 46 and the outlet 166 of the vent valve.

When the faucet 10 is installed and the water lines turned on, the pressure entering the port 50 via the passage 176 will cause the ball 168 to move against the seal 170 to seal off the outlet 166. When there is a drop in system pressure, for example when the aircraft is grounded and the system is being drained, the pressure is no longer acting on the ball 168 and the ball 168 unseats from the seal 170. Air can then flow from the aerator 46 through the passage 178 and into the vent valve 52 to push the water in the supply lines back to the supply.

Turning now to the operation of the faucet 10, the IR sensor 84 serves as the primary activation method for the faucet 10. When a user places their hands under the faucet 10, the IR sensor 84 detects the presence of the user's hands, and the optical PCBA 82 communicates the detection of the user's hands to the faucet PCBA 80. The faucet PCBA 80 then communicates the detection of the user's hands to the solenoid 44, causing the solenoid 44 to open. The water in the mixing chamber 142 then enters the solenoid 44 via the inlets 146, flows through the body of the solenoid 44, and then exist the solenoid 44 via the outlet 148. The water then flows along the flow passage 132 to the port 130 that acts as a flow passage, where the water exits the faucet 10 via the aerator 46.

The faucet 10 can also include a secondary activation method, which can be used in case the IR sensor 84 has failed or in place of the IR sensor 84. For example, the faucet 10 can include a faceplate 180 attached to the front of the faucet body 20. The faceplate 180 is a capacitive sensor, or is otherwise connected to a capacitive sensor, that is connected to the faucet PCBA 80 by suitable wires. The faceplate 180 may include a suitable icon 182, such as a water drop with a transmission symbol below it. The user can activate the faucet to initiate a flow of water by touching the icon 182, which may light up upon touch to indicate operation and/or may change color if already lit up to indicate operation. In an embodiment, when activated by the capacitive sensor 180, the faucet 10 may be designed with an adjustable timing parameter that deactivates the faucet after a predetermined time.

In another embodiment, for example when the faucet 10 is activated by a user pressing the icon 182 but when the IR sensor 84 is operational, the pressing of the icon 182 will activate the faucet 10 to initiate the flow of water. The timing function will then be handed off to the IR sensor 84 upon the IR sensor 84 sensing the presence of the user's hands. The IR sensor will then make the primary determination of timing of water flow, for example by deactivating the faucet when the user's hands are removed.

Figure 9:
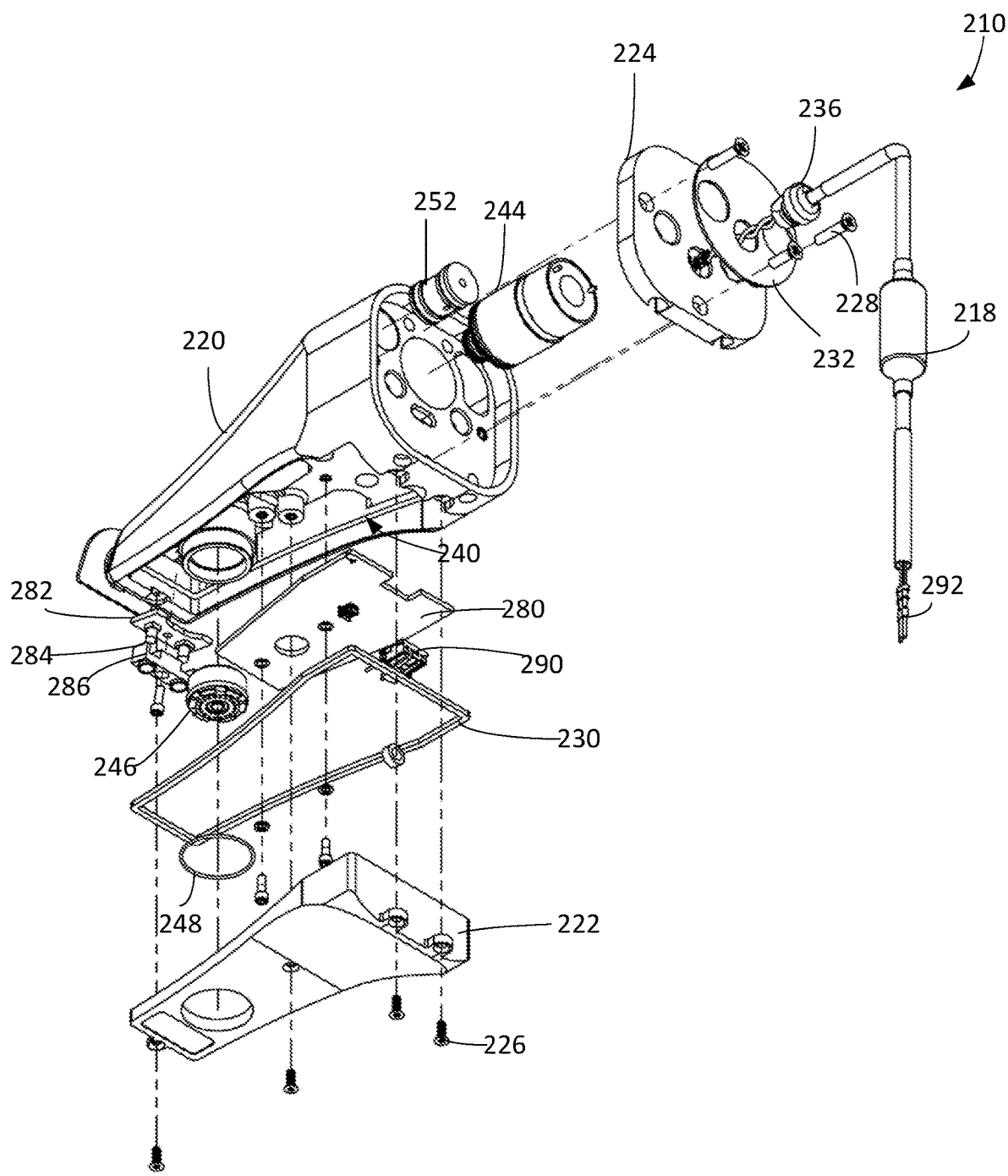
FIG. 9 is an exploded view of another exemplary faucet.

Turning now to FIG. 9, an exemplary embodiment of the faucet is shown at 210. The faucet 210 is substantially the same as the above-referenced faucet and consequently the same reference numerals but indexed by 200 are used to denote structures corresponding to similar structures in the faucets. In addition, the foregoing description of the faucet 10 is equally applicable to the faucet 210 except as noted below.

The faucet 210 includes a faucet body 220, a bottom cover 222 attached to a bottom of the faucet body 220, and a rear cover 224 attached to a rear of the faucet body 20. The bottom cover 222 and rear cover 224 may be attached to the faucet body in a suitable manner, for example by fasteners 226 and 228 respectively received in respective openings. The bottom cover 222 may be sealed to the faucet body 220 in a suitable manner, for example by a gasket 230, and the rear cover 224 may be sealed to the structure in a suitable manner, for example by gasket 232. A grommet 236 may be received in openings in the rear cover 224 and the gasket 232 that surrounds a cable 218.

The faucet body 220 receives a solenoid 244 that is activated to deliver water, for example at a uniform temperature to an aerator 246, and a vent valve 252. The aerator 246 is attached to the underside of the faucet body 220 and sealed in a suitable manner, such as by an O-ring 248.

The faucet body includes a first compartment 240 including a control board such as a PCBA 280 and a control board such as an optical PCBA 282. The first compartment 240 also includes one or more sensors 284, such as an IR sensor attached to the optical PCBA 282, and an optical baffle 286 covering the IR sensor 284. The faucet PCBA 280 is attached to a connector (not shown) that receives a corresponding connector 290, such as a microclasp housing, that is connected to the cable 218. The power cable 218 may terminate at pins 292 at its opposite end allowing an end user to select a desired connector for connecting to a power source and to allow for use with smaller openings in the structure.

The aforementioned systems, components, (e.g., faucet, sensors, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

Although certain embodiments have been shown and described, it is understood that equivalents and modifications falling within the scope of the appended claims will occur to others who are skilled in the art upon the reading and understanding of this specification.

What is claimed is:

1. A touchless faucet comprising:
   a faucet body having a first compartment and a second compartment, the second compartment having first and second water ports at a rear of the faucet body for coupling to respective water lines to couple the faucet to a panel or wall;
   at least one control board disposed in the first compartment;

an IR sensor disposed in the first compartment and communicatively coupled to the at least one control board; and
a solenoid disposed in the second compartment and communicatively coupled to the at least one control board.

2. The touchless faucet according to claim 1, further comprising a capacitive sensor coupled to a front of the faucet body and communicatively coupled to the at least one control board, wherein the faucet is configured to be activated by the IR sensor or the capacitive sensor.

3. The touchless faucet according to claim 1, further comprising a bottom cover coupled to a bottom of the faucet body to close the first compartment, and a rear cover coupled to a rear of the faucet body to hold the solenoid in position in the second compartment.

4. The touchless faucet according to claim 3, wherein the rear cover is received in a recessed area at the rear of the faucet body and is substantially flush with the rear of the faucet body.

5. The touchless faucet according to claim 1, wherein the faucet body includes a first port at a rear of the faucet body for receiving a vent valve, and a second port at the rear of the faucet body for receiving the solenoid.

6. The touchless faucet according to claim 5, wherein the second port is in fluidic communication with the first and second water ports to receive fluid in a mixing chamber.

7. The touchless faucet according to claim 5, further comprising the vent valve positioned in the first port, the vent valve including a valve body having an inlet, an internal cavity in communication with the inlet, an outlet in communication with the internal cavity, and a ball disposed in the internal cavity to close the outlet when pressurized.

8. The touchless faucet according to claim 1, wherein the solenoid has an inlet for receiving fluid from a mixing chamber formed in the second compartment and an outlet for delivering the fluid from the mixing chamber to an aerator.

9. The touchless faucet according to claim 8, wherein the IR sensor is configured to sense a presence of a user, which is communicated to the solenoid to open the solenoid to allow fluid flow through the second compartment to the aerator.

10. The touchless faucet according to claim 1, further comprising a rear cover received in a recessed area at a rear of the faucet body and coupled to the rear of the faucet body to hold the solenoid in position in the second compartment.

11. The touchless faucet according to claim 10, wherein the faucet body includes a first port in the recessed area for receiving a vent valve, and a second port in the recessed area for receiving the solenoid.

12. The touchless faucet according to claim 1, wherein the at least one control board includes a first control board and a second control board, where the solenoid is communicatively coupled to the first control board and the IR sensor is communicatively coupled to the second control board.

13. The touchless faucet according to claim 12, wherein the first control board is positioned in the first compartment rearward of the aerator, and the second control board is positioned in the first compartment forward of the aerator.

14. A touchless faucet comprising:
a faucet body having a first compartment and a second compartment;
an aerator coupled to the faucet body at a bottom of the faucet body and configured to receive fluid from the flow passage;
a control board disposed in the first compartment;
a solenoid disposed in the second compartment and communicatively coupled to the control board; and
an IR sensor disposed in the first compartment for sensing a presence of a user below the faucet.

15. The touchless faucet according to claim 14, further comprising a capacitive sensor coupled to a front of the faucet body for sensing contact by a user.

16. The touchless faucet according to claim 14, further comprising a second control board, wherein the second control board is communicatively coupled to the control board, and wherein the IR sensor is communicatively coupled to the second control board.

17. The touchless faucet according to claim 15, wherein the faucet includes a first activation mode where the faucet is activated by the IR sensor sensing the presence of the user and a second activation mode where the faucet is activated by the capacitive sensor sensing contact by the user.

18. A touchless faucet comprising:
a faucet body having a first compartment and a second compartment;
at least one control board disposed in the first compartment;
an IR sensor disposed in the first compartment and communicatively coupled to the at least one control board;
a solenoid disposed in the second compartment and communicatively coupled to the at least one control board; and
a rear cover coupled to a rear of the faucet body to hold the solenoid in position in the second compartment, the rear cover being received in a recessed area at the rear of the faucet body.

19. The touchless faucet according to claim 18, wherein the IR sensor is configured to sense a presence of a user, which is communicated to the at least one control board, and the at least one control board is configured to communicate the presence to the solenoid to open the solenoid to allow fluid flow through the second compartment to an aerator.

20. The touchless faucet according to claim 18, wherein the rear cover is substantially flush with the rear of the faucet body.

* * * * *